Patented Jan. 5, 1954

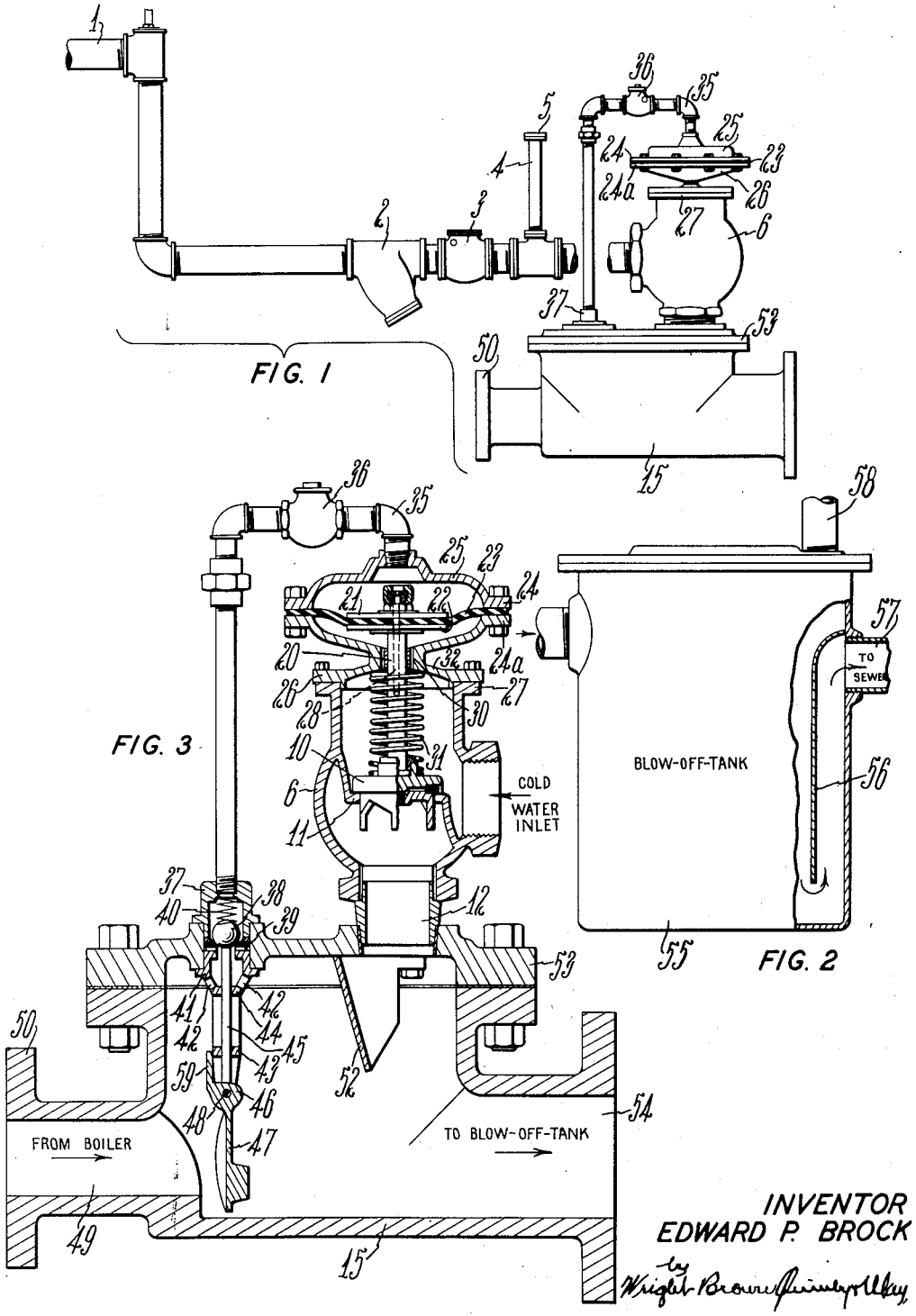

2,664,909

UNITED STATES PATENT OFFICE 2,664,909

BOILER BLOW-OFF AND SEWER
PROTECTION

Edward P. Brock, Melrose, Mass.

Application July 15, 1950, Serial No. 174,036

6 Claims. (Cl. 137—111)

This invention relates to devices for cooling the blow-off from boilers before allowing it to empty into a sewer, thus preventing damage to the sewer from the high temperature of the hot water or steam of the blow-off, and it has for an object to provide such a device of improved construction, the control of the admission of the cold water to the discharge from the boiler being derived through a diaphragm actuated valve, and the automatic actuation of the device promptly following the opening or closing of the blow-off valve.

For a complete understanding of this invention, reference may be had to the accompanying drawings in which Figure 1 is a side elevation of the central portion of the mechanism.

Figure 2 is a side elevation partly broken away and in section, of the tank which receives the discharge from the mechanism of Figure 1 before delivering it into the sewer.

Figure 3 is a central vertical sectional view through the control mechanism of Figure 1.

Referring to the drawings, at 1 is indicated a pipe leading from a cold water supply, as from town or city mains, past the usual check valves 2 and 3 and past a pipe extension 4 closed at its upper end at 5 and acting as an expansion chamber, which prevents water hammer should the flow of water be suddenly checked, and into a casing 6. As shown in Figure 3, the casing 6 contains a main valve 10 normally closing against a valve seat 11. This casing 6 discharges past the valve seat 11 through a pipe connection 12 into a casing 15.

The valve 10 is provided with a valve stem 20 which has secured to its upper end, as between a pair of disks 21 and 22, a diaphragm 23. The outer margin of this diaphragm is clamped between marginal flanges 24 and 24a of upper and lower diaphragm enclosing members 25 and 26. The lower member 26 has a flange bolted to the upper end of a mating flange 27 on the casing 6. This stem 20 is provided with a central restricted passage 28 leading from the space above the valve 10 through the diaphragm 23 and opening into the space thereabove, so that there is restricted passage from the cold water inlet port to the remote face of the diaphragm. There are also restricted passages 30 leading from above the valve 10 into the space beneath the diaphragm 23. A spring 31 reacting between the top face of the valve 10 and the cover 32 of the casing 6 which may also be a portion of the member 26 normally holds the valve 10 seated. This main valve controls the passage of the cold water from the supply into the casing 15. Under balanced conditions, it will be seen that the valve 10 is held closed by the spring 31, the pressure from the cold water on opposite sides of the diaphragm being equalized by flow through the restricted passages 20 and 30 to each face thereof.

The space above the upper face of the diaphragm, however, communicates through a pipe connection 35 containing a check valve 36 with a casing 37 carried by the casing 15 and containing a relief valve 38. This relief valve is shown as a ball which is normally held seated against its valve seat 39, as by a light spring 40. This valve seat communicates, through a hollow member 41 having discharge passages 42, with the interior of the casing 15. This member 41 has a pair of spaced guide portions 43 and 44 which slidably support a rod 45 which may engage the under face of the ball valve 38, and by upward axial motion of this rod 45 it is evident that the relief valve 38 will be dislodged from its seat, opening communication from the pipe connection 35 and through the passages 42 into the casing 15. The lower end of the rod 45 rests on the outer face of a cam portion 46 of a vane 47 which is pivoted at 48 to the lower portion of the member 41 and normally extends substantially vertically by gravity as shown in Figure 3, in front of and closely adjacent to an inlet passage 49 of the casing 15 which may have a flange 50 for connection to the blow-off pipe leading from a boiler. A stop portion 59 of this vane normally engages the bearing 43.

Whenever the boiler blow-off is opened so that the boiler discharges through the inlet passage 49 into the casing 15, this discharge immediately impinges upon the lower portion of the vane 47, swinging it upwardly and causing the cam 46 to push the rod 45 upwardly, dislodging the relief valve 38. This permits the pressure above the diaphragm 23 to be relieved through the pipe connection 35 into the casing 15, whereupon the pressure from the cold water inlet below the diaphragm 23 overbalances the spring 31 and causes the valve 10 to open, thus opening the connection from the cold water supply into the casing 15 through the connection 12.

A baffle 52 is shown as secured to the inner wall of the cover 53 of the casing 15 in position to direct the cold water passing the valve 10 into the casing 15 beyond the vane 47 and toward the outlet passage 54 for the casing 15. The cold water is thus introduced into the flow from the boiler on the down stream side of the vane 47 and has no effect to maintain the vane in position to hold the cold water supply valve open. There is therefore no tendency from the flow of cold water to prolong this flow after the boiler blow-off has been closed. Within the casing 15, therefore, this cold water is directed into the hot flow entering the casing 15 from the boiler blow-off so that the cold water mingling with the boiler discharge passes out through the passage 54. In order that the cold water may be thoroughly mixed with the hot discharge from the boiler, thus thoroughly cooling this discharge, the two are passed out through the passage 54 and into a blow-off tank 55 shown detached in Figure 2. This discharge takes place into this tank at its upper portion and is thoroughly mixed therein, then passing around the lower end of the trap wall member 56 and then upwardly and out through the discharge pipe 57 to the sewer. By this time the constituents are thoroughly mixed, the discharge from the boiler being cooled by the cold water from the cold water supply to such a point that no damage will result to the sewer by reason of high temperature. The blow-off tank 55 is preferably provided with a vent pipe to the atmosphere at 58, thus avoiding any possibility of excess pressure being developed therein. The trap partition 56 acts as a trap to prevent any escape of sewer gases back into the tank 55.

As soon as the blow-off valve from the boiler is shut, the pressure on the left face of the vane 47 is relieved, allowing this vane to return to its normally vertical position with a stop portion 59 thereof engaging the bearing 43. This allows the spring 40 to seat the relief valve 38, closing the discharge from above the diaphragm, whereupon water passing through the passage 29 again increases the pressure on the top of the diaphragm, equalizing it with the pressure beneath the diaphragm and allowing the spring 31 to seat valve 10 and shut off the cold water supply. The diaphragm control of the valve 10 provides an exceedingly flexible and positive control and the position of the inlet from the cold water is such that an intimate mixture of the cold water from the discharge of the boiler is insured while the cold water flow has no appreciable effect on the position of the vane.

From the foregoing description of an embodiment of this invention it should be evident to those skilled in the art that various changes and modifications may be made without departing from its spirit or scope.

I claim:

1. A mechanism of the class described, comprising a casing, a pair of inlet ports to said casing, one for connection to a boiler blow-off and the other for connection to a cold water supply, said casing having an outlet port, a main valve controlling said cold water supply inlet port, a diaphragm connected to said main valve, a spring normally holding said main valve seated, said mechanism comprising restricted passages from said cold water inlet port to opposite faces of said diaphragm, a connection from the face of said diaphragm remote from said valve to the interior of said casing beyond said main valve, a relief valve normally closing said connection, and means actuated by flow into said casing through said blow-off connection inlet port and positioned between said inlet ports to open said relief valve and thereby relieve pressure from said remote diaphragm face whereby pressure from said cold water inlet port on the opposite face of said diaphragm opens said main valve and permits cold water to flow from said casing and mix with flow from said boiler blow-off connection to pass out therewith from said casing through said discharge passage.

2. A mechanism of the class described, comprising a casing, a pair of inlet ports to said casing, one for connection to a boiler blow-off and the other for connection to a cold water supply, said casing having an outlet port, a main valve controlling said cold water supply inlet port, a diaphragm connected to said main valve, a spring normally holding said main valve seated, said mechanism comprising restricted passages from said cold water inlet port to opposite faces of said diaphragm, a connection from the face of said diaphragm remote from said valve to the interior of said casing beyond said main valve, a relief valve normally closing said connection, a vane movably mounted within said casing and normally positioned opposite to said blow-off inlet port and between said inlet ports to be moved by impingement of flow thereon from said blow-off inlet away from said normal position, and connections between said vane and relief valve causing motion of said vane away from normal position to open said relief valve and thereby relieve pressure from said remote diaphragm face whereby pressure from said cold water inlet port on the opposite face of said diaphragm opens said main valve and permits cold water to flow from said casing and mix with flow from said boiler blow-off connection to pass out therewith from said casing through said discharge passage.

3. A mechanism of the class described, comprising a casing, a pair of inlet ports to said casing, one for connection to a boiler blow-off and the other for connection to a cold water supply, said casing having an outlet port, a main valve controlling said cold water supply inlet port, a diaphragm connected to said main valve, a spring normally holding said main valve seated, said mechanism comprising restricted passages from said cold water inlet port to opposite faces of said diaphragm, a connection from the face of said diaphragm remote from said valve to the interior of said casing beyond said main valve, a relief valve normally closing said connection, a vane pivotally mounted within said casing and normally extending across and adjacent to said inlet port and between said inlet ports and swingable about its pivot away from normal position by flow into said casing through said blow-off inlet port, a cam member movable with said vane, and operative connections from said cam member to said inlet valve to open said relief valve and thereby relieve pressure from said remote diaphragm face whereby pressure from said cold water inlet port on the opposite face of said diaphragm opens said main valve and permits cold water to flow from said casing and mix with flow from said boiler blow-off connection to pass out therewith from said casing through said discharge passage.

4. A mechanism of the class described, comprising a casing, a pair of inlet ports to said casing, one for connection to a boiler blow-off and the other for connection to a cold water supply, said casing having an outlet port, a main valve controlling said cold water supply inlet port, a diaphragm connected to said main valve, a spring normally holding said main valve seated, said mechanism comprising restricted passages from said cold water inlet port to opposite faces of said diaphragm, a connection from the face of said diaphragm remote from said valve to the interior of said casing beyond said main valve, a relief valve normally closing said connection, a vane mounted within said casing and normally positioned opposite to said blow-off inlet port and between said inlet ports to be operated by impingement of flow thereon from said blow-off inlet away from said normal position, and connections between said vane and relief valve causing motion of said vane away from normal position to open said relief valve and thereby relieve pressure from said remote diaphragm face whereby pressure from said cold water inlet port on the opposite face of said diaphragm opens said main valve and permits cold water to flow from said casing and mix with flow from said boiler blow-off connection to pass out therewith from said casing through said discharge passage, said cold water inlet port being positioned to discharge into said casing between said vane and said discharge port.

5. A mechanism of the class described, comprising a casing, a pair of inlet ports to said casing, one for connection to a boiler blow-off and the other for connection to a cold water supply, said casing having an outlet port, a main valve controlling said cold water supply inlet port, a diaphragm connected to said main valve, a spring normally holding said main valve seated, said mechanism comprising restricted passages from said cold water inlet port to opposite faces of said diaphragm, a connection from the face of said diaphragm remote from said valve to the interior of said casing beyond said main valve, a relief valve normally closing said connection, a vane mounted within said casing and normally positioned opposite to said blow-off inlet port and between said inlet ports to be operated by impingement of flow thereon from said blow-off inlet away from said normal position, and connections between said vane and relief valve causing motion of said vane away from normal position to open said relief valve and thereby relieve pressure from said remote diaphragm face whereby pressure from said cold water inlet port on the opposite face of said diaphragm opens said main valve and permits cold water to flow from said casing and mix with flow from said boiler blow-off connection to pass out therewith from said casing through said discharge passage, said casing having a baffle positioned adjacent to said cold water inlet port and arranged to direct water entering therefrom into the flow from said blow-off inlet beyond said vane.

6. A mechanism of the class described, comprising a casing, a pair of inlet ports to said casing, one for connection to a boiler blow-off and the other for connection to a cold water supply, said casing having an outlet port, said cold water inlet port being nearer said outlet port than said boiler blow-off inlet port, a normally closed valve controlling said cold water supply inlet port, a device operatively connected thereto actuable to open said normally closed valve, and a device actuating means located between said inlet ports and within said casing and actuated by flow from said boiler blow-off inlet only to actuate said device to open said normally closed valve and permit cold water to flow into said casing.

EDWARD P. BROCK.

References Cited in the file of this patent

UNITED STATES PATENTS

| Number | Name | Date |
|---|---|---|
| 1,924,733 | Brock | Aug. 29, 1933 |
| 2,016,331 | Junkers | Oct. 8, 1935 |
| 2,112,397 | Gauger | Mar. 29, 1938 |